United States Patent [19]
Fischer et al.

[11] Patent Number: 5,678,934
[45] Date of Patent: Oct. 21, 1997

[54] BEARING HOUSING WITH A PROTECTIVE CAP

[75] Inventors: Arnold Fischer, Steinbach; Erich Kröber, Krottelbach, both of Germany

[73] Assignee: Ina Walzlager Schaeffler KG, Germany

[21] Appl. No.: 760,841

[22] Filed: Dec. 5, 1996

[30] Foreign Application Priority Data

Dec. 15, 1995 [DE] Germany ............ 195 46 676.4

[51] Int. Cl.[6] ............................................. F16C 33/76
[52] U.S. Cl. ............................................. 384/489
[58] Field of Search ............................ 384/489, 495, 384/537

[56] References Cited

U.S. PATENT DOCUMENTS

| | | | |
|---|---|---|---|
| 4,342,490 | 8/1982 | Swinley | 384/489 |
| 5,328,276 | 7/1994 | Linteau | 384/489 X |

FOREIGN PATENT DOCUMENTS

| | | |
|---|---|---|
| 316881 | 12/1919 | Germany. |
| 350348 | 3/1922 | Germany. |
| 1989633 | 7/1968 | Germany. |
| 93671 | 11/1971 | Germany. |
| 2161981 | 7/1972 | Germany. |
| 0377139 | 1/1977 | Germany. |
| 2632990 | 11/1977 | Germany. |
| 2752484 | 7/1978 | Germany. |
| 4035973 | 5/1992 | Germany. |
| 1558311 | 12/1979 | United Kingdom. |

*Primary Examiner*—Thomas R. Hannon
*Attorney, Agent, or Firm*—Bierman, Muserlian and Lucas LLP

[57] ABSTRACT

In a bearing housing (1) for a form-fitted reception of an outer bearing ring (3) of a rolling bearing comprising a protective cap (7) for closing the bearing housing (1) at one end, the jacket of the protective cap (7) exhibiting at least two outward projecting, spaced retaining projections (10, 11) which retain the protective cap (7) in the bearing housing (1) and which can be introduced axially into end inserting pockets (5) of the bearing housing (1), characterized in that the bearing housing (1) is provided with a circumferential annular groove (6) for receiving the retaining projections (10, 11) when the protective cap (7) is turned, which annular groove (6) communicates with the inserting pockets (5) in the circumferential direction of the bearing ring (3) which configuration guarantees a secure fixing of the protective cap (7) in the bearing housing (1).

7 Claims, 5 Drawing Sheets

BEARING HOUSING WITH A PROTECTIVE CAP

FIELD OF THE INVENTION

The invention concerns a bearing housing for a form-fitted reception of an outer bearing ring of a rolling bearing, said bearing housing being closed at one end by a protective cap whose jacket exhibits at least two outward projecting, spaced retaining projections which can be introduced axially into end inserting pockets of the bearing housing and retain the protective cap in the bearing housing.

BACKGROUND OF THE INVENTION

A bearing housing comprising an outer bearing ring and a protective cap is known, for example, from DE-OS 27 15 416. The cap comprises a circumferential rim which engages into an inner peripheral groove of the bearing ring. A mounting of this protective cap made of a plastic material is only possible by a strong deformation thereof so that the circumferential rim can be introduced into the bore of the bearing ring before it comes to engage into the peripheral groove.

DE-OS 30 25 231 shows a bearing housing having an outer bearing ring and a metal protective cap which is detachably fixed on the bearing ring by two lips of the protective cap which are situated diametrically opposite each other and engage into an outer peripheral groove of the bearing ring. The lips project from resiliently deformable extensions of the protective cap and are oriented radially inward. For disengaging the protective cap from the bearing ring, the cap has to be deformed by a pressure exerted on its peripheral surface so that the extensions are moved radially outwards and the lips exit from the peripheral groove of the bearing ring.

Another bearing housing of the initially cited type known from DE-GM 19 89 633 comprises a protective cap which is retained in the inserting pockets by a resilient abutment of its two diametrically oppositely situated retaining projections against boundary surfaces of the pockets. The retaining projections which form extensions of the conical cap jacket extend approximately in axial direction. While the mounting of the cap on the bearing housing by insertion of the retaining projections into the inserting pockets is as simple as conceivably possible, the cap can just as simply be disengaged from the bearing housing, even unintentionally, for example, due to tilting.

OBJECTS OF THE INVENTION

It is an object of the invention to provide an improved bearing housing in which a secure fixing of the protective cap on the bearing housing is guaranteed under all conditions.

This and other objects and advantages of the invention will become obvious from the following detailed description.

SUMMARY OF THE INVENTION

The invention achieves the above object by the fact that the bearing housing comprises a circumferential annular groove which communicates with the inserting pockets in the circumferential direction of the bearing ring and receives the retaining projections when the protective cap is turned. Prior to the mounting of the protective cap, the bearing is already mounted on the shaft and inserted into the bearing housing. The housing is screwed on to a machine element.

The invention makes it possible to introduce the retaining projections of the protective cap into the inserting pockets, hold the protective cap in place and then turn it through 90° about its own axis and about the axis of the bearing. The retaining projections are thereby displaced in the circumferential direction within the annular groove till the protective cap is clamped tight.

The clamping effect is obtained by the shape of the retaining projections. The protective cap gets pressed radially into a slightly oval shape in the region of the retaining projections. The protective cap is then supported by the surfaces of the retaining projections in the annular groove, the clamping force being produced by the retaining projections.

The protective cap can comprise two retaining projections arranged diametrically opposite each other. In the region of the retaining projections, the protective cap can be supported by its end edge defined by the inner diameter of the protective cap on the outer surface of the bearing ring. This configuration permits the retaining projections to absorb greater retaining forces in the direction of the shaft axis.

The protective cap can be made of a plastic material, while the bearing housing can be a steel casting with inserting pockets formed in it during the casting procedure. The annular groove can be made in the bearing housing by machining. A spherical segment-shaped outer surface of the outer bearing ring bears closely against a suitably shaped inner surface of the bearing housing.

DETAILED DESCRIPTION OF THE DRAWINGS

Figure 1:
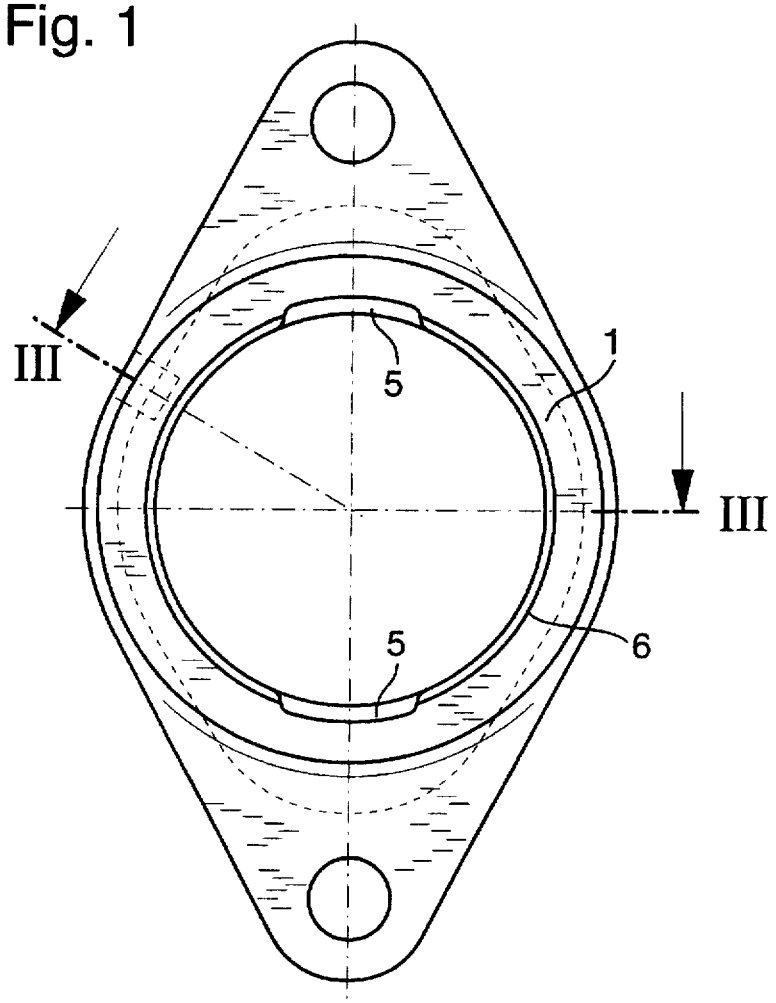
FIG. 1 is an end view of a bearing housing of the invention.
Figure 2:
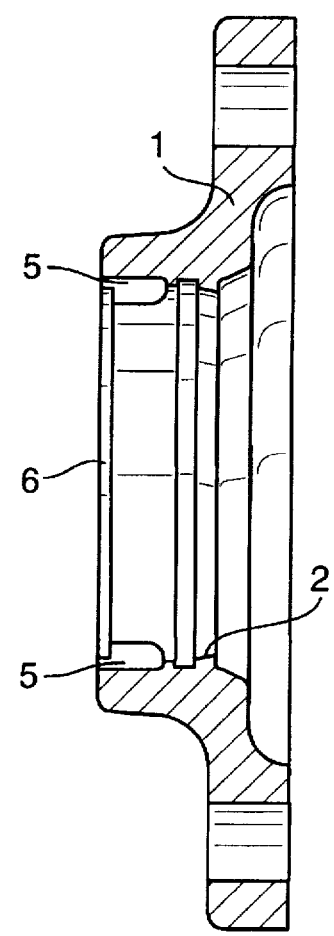
FIG. 2 is an axial section through the bearing housing of the invention.
Figure 3:
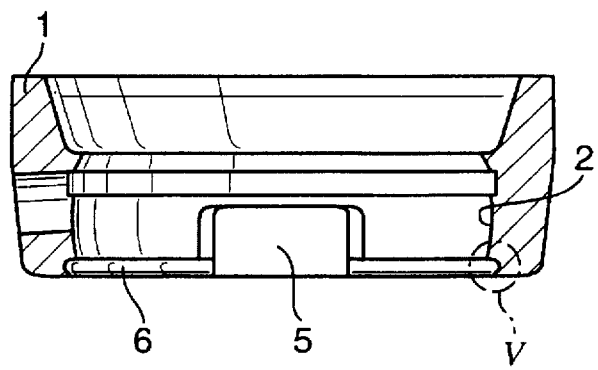
FIG. 3 is a radial section through the bearing housing taken along line III—III of FIG. 2.
Figure 4:
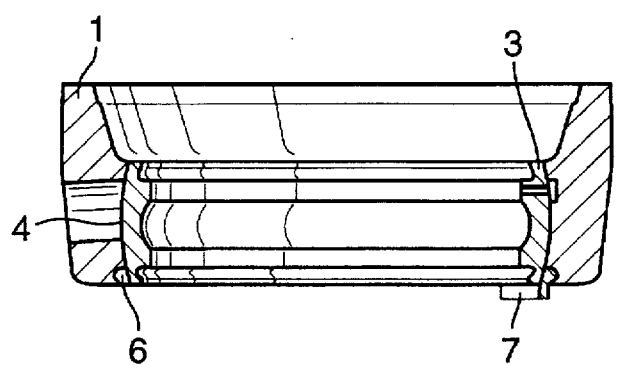
FIG. 4 shows the bearing housing of FIG. 3 with an inserted outer bearing ring of a rolling bearing.
Figure 5:
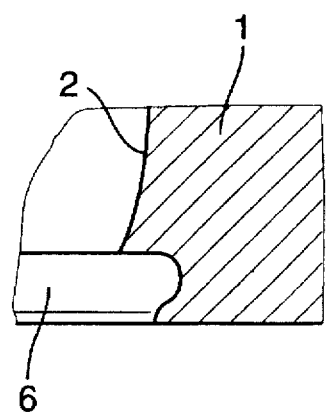
FIG. 5 is an enlarged view of the detail V of FIG. 3.
Figure 6:
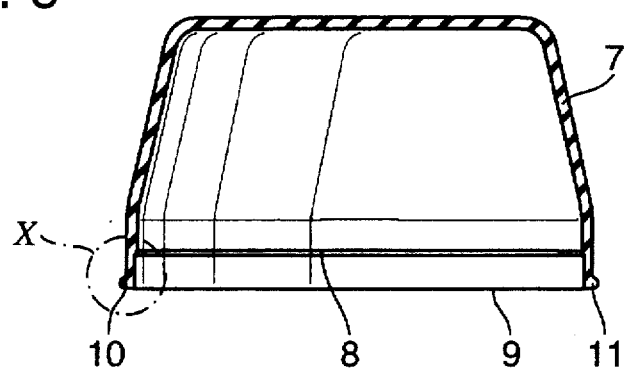
FIG. 6 is a sectional view of a protective cap comprising retaining projections.
Figure 7:
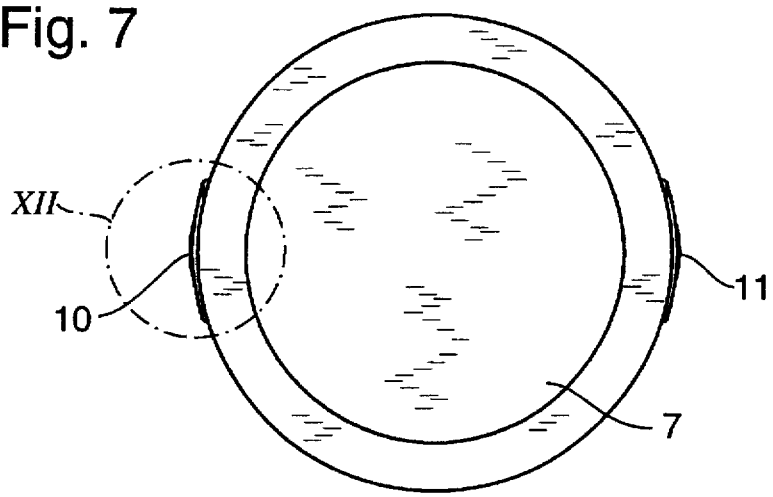
FIG. 7 is an end view of the protective cap with the retaining projections.
Figure 8:
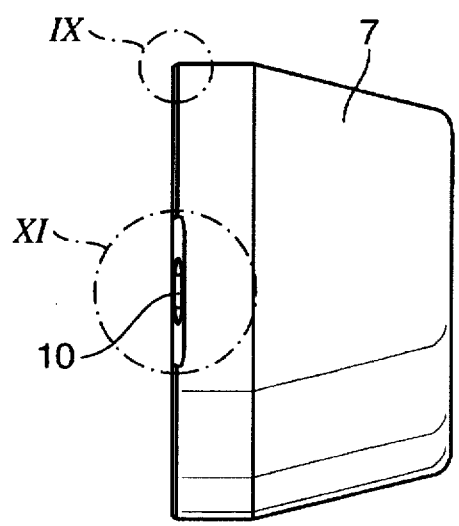
FIG. 8 is a side view of the protective cap.
Figure 9:
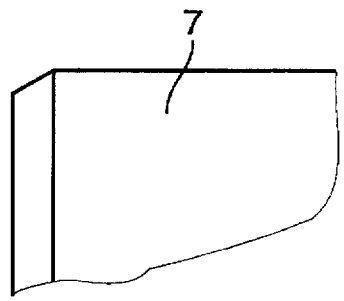
FIG. 9 is an enlarged view of the detail IX of FIG. 8.
Figure 10:
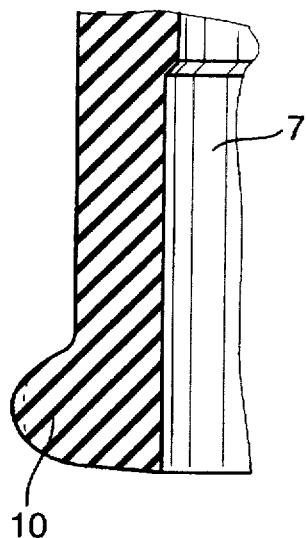
FIG. 10 is an enlarged view of the detail X of FIG. 6.
Figure 11:
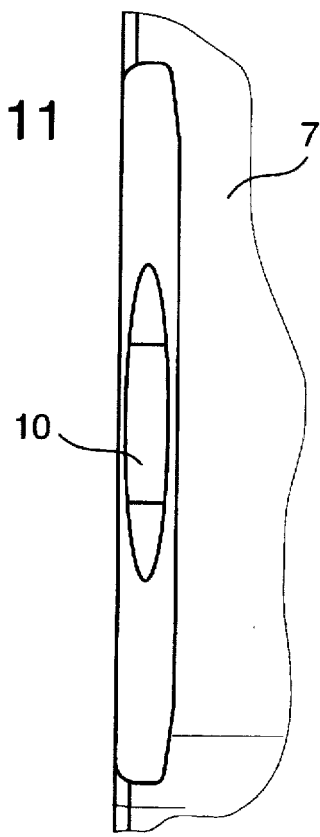
FIG. 11 is an enlarged view of the detail XI of FIG. 8.
Figure 12:
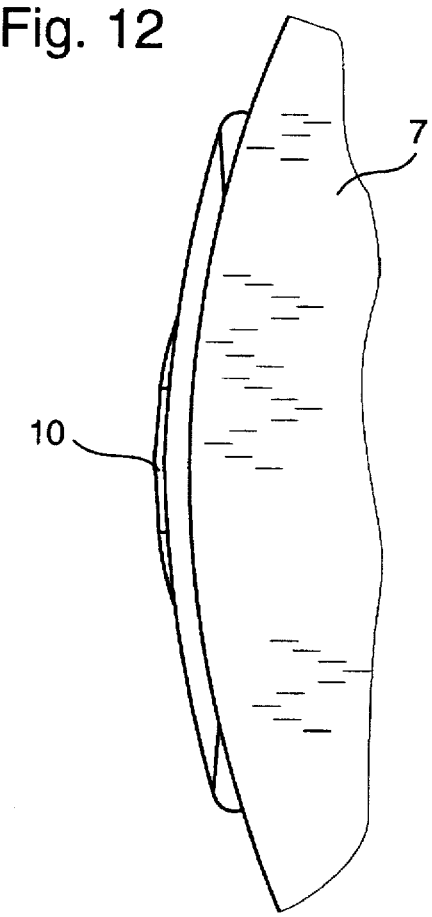
FIG. 12 is an enlarged view of the detail XII of FIG. 7.
Figure 13:
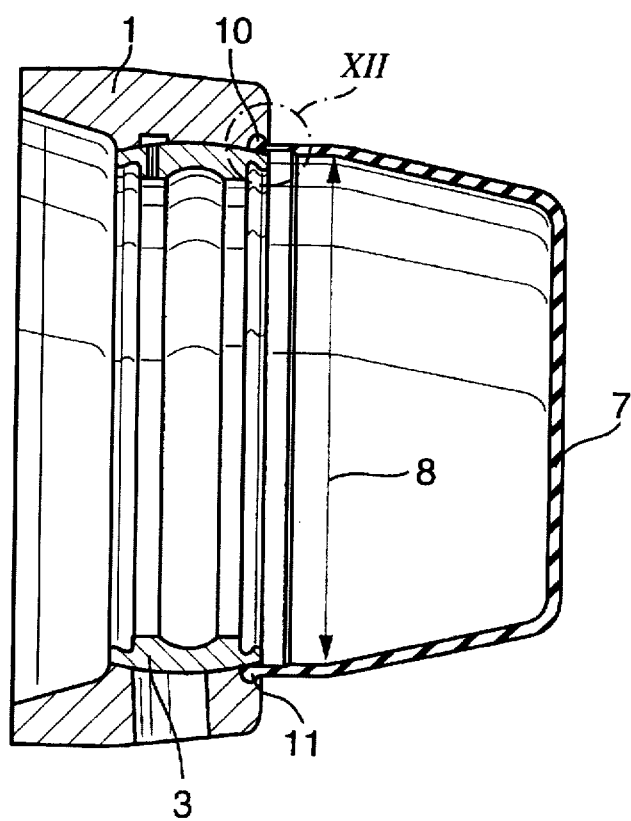
FIG. 13 is a longitudinal cross-section through a bearing housing having a bearing ring and a protective cap.
Figure 14:
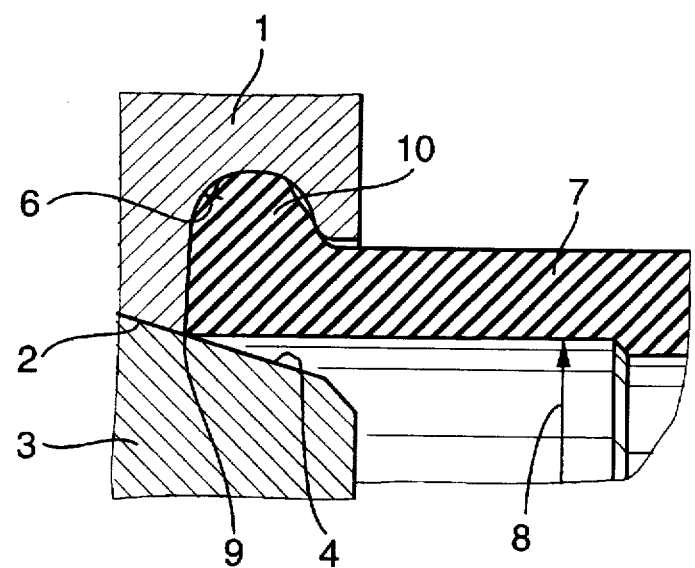
FIG. 14 is an enlarged view of the detail XIV of FIG. 13.

A bearing housing 1 of the invention is made as a steel casting and comprises a spherical segment-shaped inner surface 2 on to which is fitted a corresponding spherical segment-shaped outer surface 4 of an outer bearing ring 3 of a rolling bearing. The bearing housing 1 comprises two cast-in inserting pockets 5 situated diametrically opposite each other. An annular groove 6 is machined into the bearing housing 1 by a turning procedure. The annular groove 6 extends in circumferential direction on the inner surface 2 of the bearing housing 1 and is interrupted by the two inserting pockets 5 which extend from a front end of the bearing housing 1 so that the inserting pockets 5 and the annular groove 6 communicate with one another.

The bearing housing 1 is closed at one front end by a protective cap 7 which has a slightly conical shape which, at the open end of the protective cap 7, changes into a circular cylindrical shape with an inner diameter 8. In the region of its end edge 9 defined by the diameter 8, the protective cap 7 comprises two retaining projections, 10 and 11, situated diametrically opposite each other and extending radially outwards from the outer surface of the protective cap 7.

The mounting of the protective cap 7 on the bearing housing 1 is extremely simple. With its open end foremost and the retaining projections 10 and 11 in alignment with the inserting pockets 5, the protective cap 7 is moved in the direction of its axis, which is also the direction of the axes of the bearing housing 1 and the outer bearing ring 3, towards the bearing housing 1. After the retaining projections 10 and 11 have been introduced into the inserting pockets 5, the protective cap 7 is turned through 90° about its axis. This causes the retaining projections 10 and 11 of the protective cap 7 to be displaced into the annular groove 6 of the bearing housing 1.

The annular groove 6 and the retaining projections 10 and 11 are configured so that, at the end of the turning of the protective cap 7 about its axis, the retaining projections 10 and 11 are clamped within the annular groove 6. In this state, the protective cap 7 no longer has its circular cylindrical shape in the region of the retaining projections 10 and 11 but is pressed into a slightly oval shape. Since, on completion of this assembly, the end edge 9 of the protective cap 7 is supported on the spherical segment-shaped outer surface 4 of the outer bearing ring 3, an axial pulling-out of the protective cap 7 out of the bearing housing 1, or a removal of the protective cap by tilting it, is not possible. The bearing housing 1 of the invention therefore guarantees a firm and reliable seating of the protective cap 7.

Various modifications of the bearing housing of the invention may be made without departing from the spirit or scope thereof and it is to be understood that the invention is intended to be limited only as defined in the appended claims.

What we claim is:

1. A bearing housing for a form-fitted reception of an outer bearing ring of a rolling bearing, said bearing housing being closed at one end by a protective cap whose jacket exhibits at least two outward projecting, spaced retaining projections which can be introduced axially into end inserting pockets of the bearing housing and retain the protective cap in the bearing housing, characterized in that the bearing housing (1) comprises a circumferential annular groove (6) which communicates with the inserting pockets (5) in the circumferential direction of the bearing ring (3) and receives the retaining projections (10, 11) when the protective cap (7) is turned.

2. A bearing housing of claim 1 wherein two retaining projections (10, 11) are arranged diametrically opposite each other on the protective cap (7).

3. A bearing housing of claim 1 wherein the protective cap (7) is made of a plastic material.

4. A bearing housing of claim 1 made as a steel casting in which the inserting pockets (5) are formed during casting.

5. A bearing housing of claim 4 wherein the annular groove (6) is made in the bearing housing (1) by machining.

6. A bearing housing of claim 1 wherein a spherical segment-shaped outer surface (4) of the outer bearing ring (3) bears closely against a suitably shaped inner surface (2) of the bearing housing (1).

7. A bearing housing of claim 6 wherein, in a region of the retaining projections (10, 11), the protective cap (7) is supported on the outer surface (4) of the bearing ring (3) by an end edge (9) of the protective cap (7) defined by an inner diameter (8).

* * * * *